Feb. 3, 1959    C. A. KERNER    2,871,705
GYROSCOPIC TOP

Filed March 25, 1950    2 Sheets-Sheet 1

INVENTOR:
CHARLES A. KERNER
BY Herbert E. Metcalf
HIS PATENT ATTORNEY

Feb. 3, 1959 C. A. KERNER 2,871,705
GYROSCOPIC TOP
Filed March 25, 1950 2 Sheets-Sheet 2

INVENTOR:
CHARLES A. KERNER
BY Herbert E. Metcalf
HIS PATENT ATTORNEY

United States Patent Office 2,871,705
Patented Feb. 3, 1959

2,871,705

GYROSCOPIC TOP

Charles A. Kerner, Los Angeles, Calif., assignor to Northrop Aircraft, Inc., Hawthorne, Calif., a corporation of California Application March 25, 1950, Serial No. 151,914

14 Claims. (Cl. 74—5.7)

The present invention relates to gyroscopes and more particularly to a gyroscopic top suitable for use as an artificial horizon in precision navigation systems.

An automatic celestial navigation system for a guided missile, for example, requires an accurate component to indicate the horizon. In a precision system of that type suitable, for example, for a long range missile, an overall allowable error of only 50 seconds of arc can be permitted. Of the total allowable error, not over 30 seconds of arc error can usually be tolerated in indicating the horizon, and in converting this intelligence into a suitable guidance signal. The need for great refinement and improvement in conventional methods of horizon indication is apparent in view of the fact that the best aircraft horizon gyroscopes in use today rarely indicate the true horizon within 30 minutes of arc.

One means hitherto developed for determining the horizon is the "Bonneau" gyroscope patented by E. E. J. Bonneau in 1922 (U. S. Patent No. 1,435,580). An examination of the printed patent reveals that the following desirable characteristics are attributed therein to the device:

(1) Stable indication of the vertical.
(2) Instantaneous indication of the vertical provided displacement of the gyroscope is not direct.
(3) Erection to the vertical in a single plane.
(4) Relative insensitivity to lateral accelerations.

The Bonneau gyroscope is a specialized form of top, and in consequence will henceforth be referred to as such for the sake of brevity. The Bonneau top is supported by a spherically ended peg resting in a concave, spherical cup. The center of gravity of the top is located at the center of the spherical peg. This location of the C. G. results in a naturally stable condition and therefore, after translation of the peg to the lowest point of the support, the top is free of gravitational torque. Due to the direction of the gravitational force field, the top will erect to the perpendicular of the plane tangent to the spherical support at the point of contact. As in the case of all spinning tops, the erection force is due solely to the frictional effect of the rotating peg, and the resulting torque effect about the center of gravity of the body.

If the top were pendulous, or top heavy as are the majority of toy tops, the resultant effect would be a combination of frictional torque and gravity torque, the two being at right angles to each other, resulting in the familiar precessional final path which slowly approaches the position of the vertical.

However, the Bonneau top, being in general naturally stable, may under certain conditions experience no gravity torques, and will theoretically at least approach the vertical with a straight line motion. This latter condition assumes the top to be at the lowest point of the support, which is an idealized assumption since the frictional erection force itself will result in a small translation effect up the slope of the spherical support until stable equilibrium is realized.

The erection rate of a Bonneau top is therefore theoretically independent of the mass; and is a direct function of the coefficient of friction, spin velocity, radius of peg, cosine of the angle of inclination and the square of the radius of gyration.

Erection of the Bonneau top to the true local apparent vertical is dependent solely on one acceleration, namely gravity. However, since for the purposes of the present invention the instrument will be incorporated in a moving vehicle, the effect of a number of other additional accelerations, resulting from this incorporation must be considered.

In principle, the Bonneau top does not directly indicate the horizon, but aligns its axis of spin with the direction of the local gravitational field. However, a plane perpendicular to the axis of spin defines the horizon and it is from this plane that horizon intelligence can be taken.

As a result of gyroscopic stability, the indicated horizon will be the resultant of all forces acting on the top, integrated over a period of time. Since the top is theoretically incapable of precession, a true period will not exist. However, an equivalent period exists and is a function of the erection rate. A long equivalent period, i. e., a slow erection rate, will result in greater stability and integrating ability. As in the case of any gyroscopic instrument, the ideal condition will exist when the ratio of angular momentum to random precessional torques reaches infinity. This condition may be closely approached in the Bonneau top in which the only frictional restraint present is utilized in the erection powers. Short duration lateral accelerations, provided they are followed by equal accelerations of opposite phase will therefore have little or no effect on the integrated position of the top. However, sustained unidirectional accelerations such as those caused by straight line or angular accelerations must be accounted for and subsequently corrected.

It is therefore found that to achieve the desired accuracy, a Bonneau top must be free of all extraneous forces.

However, during a study of Bonneau type tops, a number of characteristics have been discovered not apparent in the disclosure of the original patent cited above, as follows:

(1) The Bonneau top cannot be continuously rotated under power as is a conventional gyro, because forces due to the rotation means used can prevent the apparent vertical from being reached.

(2) The Bonneau top does not erect instantaneously as set forth in the patent.

(3) In consequence, the top must be operated in an intermittent fashion, thereby preventing the continuous indication of intelligence, and at the same time necessitating the use of speed controls, timers and other auxiliary equipment.

(4) The maximum rotational speed is limited to a fairly low value by rotational instability phenomena, thereby reducing gyroscopic stability and coasting time. Increases of this speed are prevented by the necessity for a large enough peg to prevent excessive bearing pressure and consequent wear between peg and support, as will be more fully discussed later. The Bonneau patent is silent on the subject of peg and support materials, and the effect of wear therebetween.

(5) The bearing pressure between peg and support is critical and necessitates the use of a light weight top of low moment of inertia, resulting in a relatively short coasting period. Also, this bearing pressure necessitates the use of extremely hard supports of microscopic smoothness, which require considerable skill and time to fabricate.

It is an object of the present invention to provide an improved gyroscopic top of the Bonneau type, wherein a high degree of indication accuracy can be obtained, in spite of the above recited characteristics.

Furthermore, it is another object of the present invention to provide an operating cycle for a top type gyro that will minimize these characteristics of the top, to the extent that precision operation over substantial periods of time can be obtained.

To attain this latter object, a cycle has been provided in accordance with the present invention, composed of the following phases:

(1) A period providing for the acceleration of the top to a maximum operational speed.

(2) The removal of all rotational torques.

(3) The provision of a period to permit the top to erect.

(4) The provision of a period during which indications of the top are valid.

(5) The provision of a period for reacceleration of the top to the maximum operational speed upon reaching a minimum operational speed.

The necessity of a cycle of this latter type, provided the period during which the top is properly erected is long as compared to the other phases of the cycle, is not a serious navigational disadvantage. If the reference plane of the top be disregarded during acceleration and erection, any error in flight path accumulated during these phases will be corrected upon subsequent erection of the top to the true apparent vertical. A final acceleration of the top can be performed upon reaching the close proximity of the missile destination, for example, thus assuring continuous intelligence during the most exactly precise portion of the flight. A practical alternative is the use of two tops, operating in opposite phase, thus providing continuous intelligence of the horizon.

These considerations have led to the following characteristics of a preferred method employed to control the top:

(1) The acceleration time is held to a minimum.

(2) All forces created by the accelerating means are removed upon reaching a maximum speed.

(3) A relatively long coasting period is provided.

(4) Means are provided to control the speeds at which the accelerating torques are applied and removed.

(5) The top position is sensed only after erection during the coasting period.

It is still another object of the present invention to provide a means and method of controlling a top type gyro to provide precision operation thereof.

Adaptation of previously developed methods for this type of acceleration control are not feasible since, in general, they accelerate the top quite slowly and, unless cages are completely removed from around the top, the resulting retarding torque slows the top rapidly.

It is a further object of the present invention to provide a means and method of accelerating a top type gyro to create minimum interference with valid indications of the top while coasting.

It is still another object of the present invention to provide a top type gyro having a relatively long coasting period in which the top will indicate the apparent horizon.

Briefly, the present invention includes the use of a Bonneau type top which is driven, preferably in a vacuum chamber, by a rotating electric field. Optical means are provided for indicating deviation of the top from the vertical, once attained, and optical means are provided to indicate the rotational speed of the top. The top is driven cyclically, and allowed to coast between driving periods with position indications for navigational or other use being picked off only while the top is coasting and stabilized. The cyclical driving and coasting periods can be speed controlled or, in cases where top characteristics are well known, time controlled, or both. Specific and preferred constructions and materials have been found increasing the stability of the top and greatly lengthening the bearing life of the top, as will be more fully brought out in the ensuing description of the drawings in which:

Figure 1:
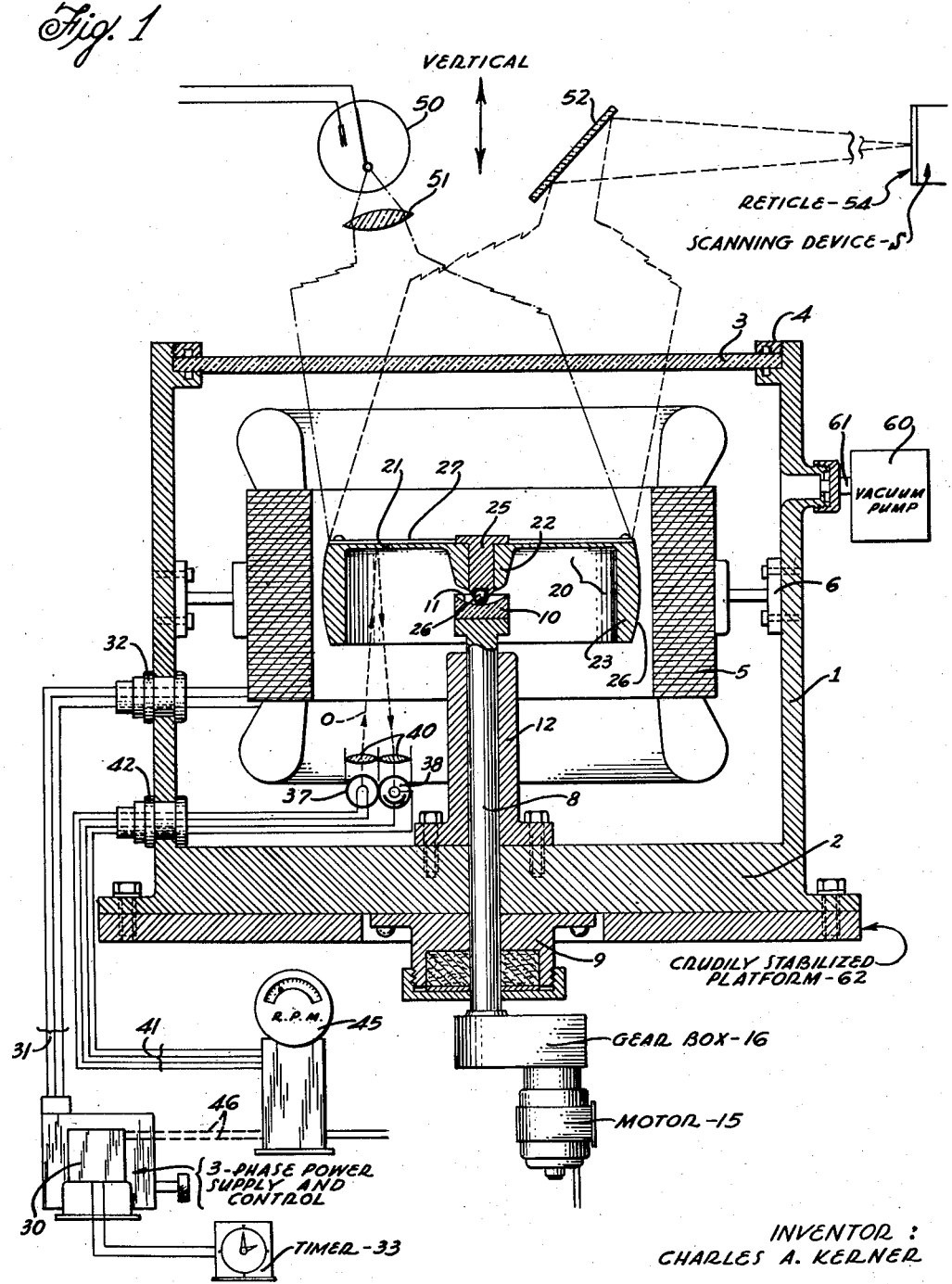
Figure 1 is a diagrammatic vertical sectional view of a preferred form of gyroscopic top, drive, and pick off, constructed in accordance with the present invention.

Referring first to Figure 1, a vacuum casing 1 is provided having a heavy base 2 and an optical glass top 3, secured by sealing ring 4 to casing 1.

Inside casing 1, a 3-phase stator 5 is supported by a ring bracket 6, the stator 5 being positioned with its axis vertical, and central within the casing 1. At the bottom of the casing 1 a central support shaft 8 enters the casing 1 through a gland 9, and extends upwardly to position a peg support 10 having a spherical top surface 11 at a level substantially midway between the ends of stator 5. Inside the casing, shaft 8 is securely located by a central bearing 12 extending upwardly from casing bottom 2. Outside of the casing, shaft 8 is rotated, as by motor 15 through a reduction gear box 16.

A top 20 of the general Bonneau type is mounted to revolve on support 10.

The top 20 comprises a thin upper plate 21 extending outwardly from a central boss 22 to support a rim 23. Boss 22 is centrally bored to receive a bearing ball retainer 25 holding a peg in the form of a bearing ball 26 in contact with the surface 11 of the glass support 10. Rim 23 has a spherical outer surface centered on the center of the bearing ball 26. A preferred material for the top is aluminum, which is hard to provide with a high surface polish, so that in this case the upper surface of the top is provided with an optically flat, front surface coated, mirror 27. The entire top is carefully machined under the best presently known precision practices to obtain as exact centering of the ball 26, and as exact normality of the mirror 27 to the top axis as is practical, together with as close a static and dynamic balance as is possible under presently known techniques.

It has been found that balancing can be accomplished by means well known in the art up to the point where the limiting balance is determined by the consistency of the friction effects between the ball and support surface.

To drive the top, the 3-phase stator 5 is supplied with 400 cycle current from a 3-phase power supply and speed control 30, for example, through a power line 31 entering the casing 1 through a seal plug 32, so that a controlled rotating field is produced in stator 5 to rotate the top. The power supply can also be placed under the control of an on-off timer 33 so that the rotating field can be applied, if desired, for a predetermined time, and then removed for a predetermined time.

Figure 2:
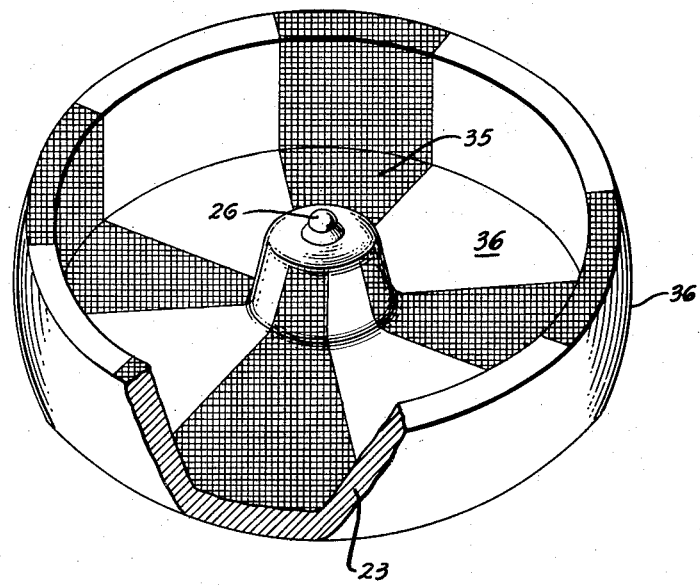
Figure 2 is a perspective view of the under surface of the top of Figure 1, showing speed indicating sectors thereof.

In order that the speed of the top can at all times be monitored, the top is provided on its lower surface with alternate black and white sectors 35 and 36 respectively, as shown in Figure 2. Beneath the top, inside of the casing, a light source 37 is positioned along side of an adjacent photocell 38, light being projected through lenses 40 from the source 37 to the under surface of the top and back to the photocell 38 as indicated by the optical path line O. The necessary circuit wires 41 from the light source 37 and photocell 38 pass through a second seal plug 42 in the casing 1, and the fluctuations due to sector interruption of the light are registered on an electrical R. P. M. meter 45 as is well known in the art. In case it is desired to control the top periods on a speed basis, a connection 46 can be provided between the R. P. M. meter 45 and the 3-phase power supply 30.

In order to sense relative movement of the top and its environment, a so-called "point" light source 50 is provided outside of casing 1, light from which is projected by a lens 51 through the glass top 3 of the casing 1 onto the mirror 27 at a slight angle. The light is then reflected, outside of the casing, over a long optical lever arm by outside mirror 52, the light from light source 50 eventually being focused on a reticle 54 for observance, or as would be required in automatic systems, for scansion to create a signal representing sense and amount of deviation of the focal spot from a control position. Such a scanning device is known in the art, and the device is represented by block S.

The drag between the top and the surrounding air is preferably reduced by operating the top in a partial vacuum, the casing 1 being continuously exhausted as by a vacuum pump 60 through vacuum line 61. No difficulty has been encountered in maintaining an absolute pressure of 0.4 inch of mercury in casing 1. Operation of the top in this reduced pressure greatly prolongs the coasting time. In the operation of one particular top, it was found at 1000 R. P. M. at atmospheric pressure, over one half the retarding torque was due to skin friction. Another advantage of vacuum operation is the removal of random air currents around the top with a consequent increase in accuracy.

As the Bonneau type top is limited to a rather small angle that the axis of the support 10 can assume to the vertical without touching the underside of the top, or allowing the top to slide off the edge of the support 10, it is desirable that the top be operated on at least a crudely stabilized platform 62. This platform can be stabilized for example, by a gyroscope of the conventional type, as is well known in the art. Such a stabilization is also valuable to maintain the axis of the stator 5 relatively close to the vertical, because when an accelerating torque is being applied to the top, the axis of the top tends to align itself somewhere between the vertical and the axis about which the torque is being applied. A platform stabilizing to about 1 degree of arc from the vertical is satisfactory. Lamp 50, lens 51, mirror 52, reticle 54, and scanning device S are also preferably mounted to move with platform 62.

It should be noted that with relative heavy tops, the bearing pressure between the peg and the support may be extremely high, on the order of a few hundred thousands of pounds per square inch, for example. Such a figure is not considered excessive in conventional ball bearings where all contact is in the nature of a pure rolling contact. In the type of the top described however, the areas of contact slide over one aonther, limiting the allowable bearing load to a few thousand pounds per square inch, if the wear is to be reduced to a minimum. Thus, it is desirable to increase the radius of ball 26 with respect to the radius support surface 11. The accuracy of erection deteriorates rapidly with wear of either support or peg.

However, one of the principal difficulties in the operation of a Bonneau top type gyroscope is the tendency of the top to be unstable at relatively low speeds. Inasmuch as the sensing period in which the position of the top is valid to indicate the vertical and horizontal is the coasting period, it is obvious that the higher the initial speed of the top, the longer the coasting time will be.

During experimentation with various top configurations, two distinct and unexpected perturbations in the action of the top have been found. The first of these and the most apparent, determines a possible maximum speed and is best described as a waltzing motion. As the top spins in its axis, the point of contact between the peg and support describes a small circle, without visibly affecting the alignment of the axis of the top with the vertical, thus effecting a circular translation of the top in a horizontal plane. The sense of this waltzing has been found to be opposite to that of the top's rotation, and to occur at a rate of about 60 R. P. M.

At the lower end of the speed range the waltzing ceases at about 600–700 R. P. M. and as speed is increased, the amplitude of the waltzing oscillation increases until a speed is reached at which the top will oscillate out of its spherical support.

A second motion observed is a pronounced nutation or wobble of the entire top about its spin axis. The frequency of the wobble is approximately that of the top's rotation and becomes smaller in amplitude as the rotational speed is increased. The real problem is, in consequence of these motions, to design a top and top mounting so that the top will have a satisfactory coasting period between a certain stable maximum speed and a certain stable minimum speed, in which waltz and wobble do not enter as significant perturbations. However, wobble can be eliminated by reaccelerating the top just before it reaches a minimum speed at which significant wobble occurs. The problem then remains to obtain a sufficiently high maximum speed without significant waltzing so that between this maximum speed and the minimum speed to avoid wobble, a satisfactory sensing period is present.

Tests have clearly indicated that waltzing is a function of the diameter of the supporting ball 26 and the radius of the support surface 11. To increase the rotational speed of the top, without running into severe waltzing, it has been found desirable to decrease the diameter of the support ball 26 and to increase the radius of the support surface 11.

However, decreasing the diameter of the ball 26 greatly increases the contact pressure between ball 26 and the support surface 11 unless the top is made very light. Thus engineering compromises must be made, as follows:

(1) The top should be as light as possible and at the same time incorporate the maximum moment of inertia possible. This requires that:

a. The maximum proportion of the mass is to be at the periphery of the top.

b. The top is to have the maximum lateral dimensions practical.

c. The top must be made of a light material to reduce mass. Since the moment of inertia varies directly with the mass and as a power of the diameter, every effort should be made to reduce the mass without reducing the lateral dimensions of the top.

(2) The top should have the maximum ratio of moment of inertia about the spin axis, to moment of inertia about a lateral axis.

(3) The ratio of support surface radius to ball radius should be the maximum possible commensurate with satisfactory wear characteristics.

(4) The support should be small enough to prevent the top from sliding off the support when the support is tilted to a practical angle with the vertical.

(5) The diameter of the ball should be sufficient to keep the bearing pressures relatively low.

(6) The support surface should be extremely hard and smooth and the support should be fabricated of as homogeneous material as possible.

(7) The ball should be slightly softer than the support, and very smooth to reduce abrasion of the support and at the same time permit the peg to wear smoothly.

(8) Means should preferably be provided to rotate the support to reduce the possibility of the ball "sleeping" on one point on the support surface, but only at a rate sufficiently low to prevent interference with the accuracy of top erection.

Extensive experimentation has indicated that a satisfactory specific and preferred example of a Bonneau type top that incorporates the above set forth engineering compromises can be made as follows, according to the present invention:

Material: Aluminum.
Top:
    Diameter=3 inches
    Height=⅜ inch
    Weight=.184 lb.

Peg: 5/32 inch diameter, preferably an S. A. E. 52100 bearing ball.
Support: Preferably "Corning" 790 glass, having a support surface of 1 inch radius, optically polished.
Maximum stable speed—about 2000 R. P. M.
Minimum stable speed—about 700 R. P. M.

In operation of this particular top, the axis of rotation of shaft 8 and support 10 is slightly inclined to the vertical and the shaft is rotated at about 10 R. P. M. by motor 15 to prevent the peg staying in one position on the support surface 11 seat and galling the seat.

Because of the high bearing pressure, the use of proper peg and support materials is highly important. A hard glass support surface has been found to experience less wear than hard metals such as "carboloy," "Nitralloy," "Stellite" or chromium plated supports. Precision steel bearing balls, because of their smooth finish and close sphericity have been found to be better than tungsten carbide or agate balls, for example, particularly as the latter materials will, because of their hardness, wear the support surface when glass is used. Of all the metals tested as supports, carboloy and Nitralloy have the best wear characteristics. Synthetic sapphire is satisfactory as a support material, but is very difficult to curve and polish properly without residual scratches, and when so roughened wears the bearing ball badly. As the combination of a bearing ball operating on a highly polished hard glass support will provide a bearing life longer than needed for missile guidance, this combination is preferred as being satisfactory for the purpose.

Support 10 should not be rotated rapidly. While it has been found that the speed at which waltzing starts is increased by an increment approximately equal to the speed of support rotation, rapid support rotation as a means of increasing the maximum operating speed has been found to be impractical because of accompanying displacements of the spin axis with consequent destruction of accuracy. Further, if the rotation of the support should for any reason stop while the top is spinning at greater than normal waltzing speed, the waltzing motion is rapidly precipitated.

Figure 3:
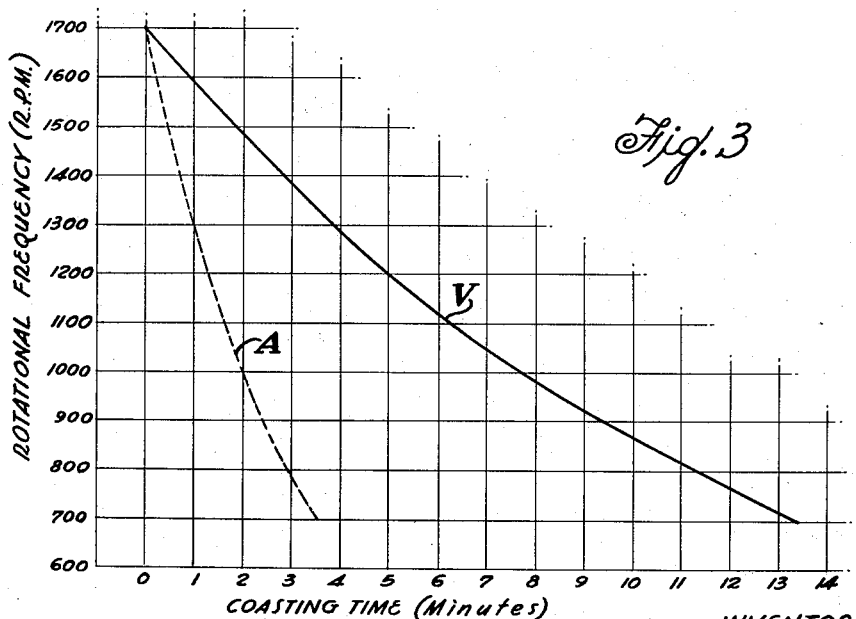
Figure 3 is a graph of the coasting characteristics of the top of Figure 1 in the atmosphere and in a partial vacuum.

A specific top of the above description has been driven by a 3-phase stator as described, for over 16 hours at about 2000 R. P. M. without significant rotational perturbations (waltzing) and without significant signs of wear on either the ball or support. It is also desirable to mount the ball 26 so that it can rotate with respect to the top, and to use a small amount of a good lubricating oil, such as bombsight oil, on the support surface. When the specific top as described is mounted to rotate in a vacuum, it has been found that in spite of its relatively light weight, the coasting time, after acceleration in a vacuum of 0.4 in. of mercury absolute is, as shown in curve V of Figure 3, about 11 minutes between 1700 R. P. M. and slightly over 800 R. P. M.; as contrasted with a comparative coasting time of only about 3 minutes at atmospheric pressure, as shown by curve A of Figure 3.

It has also been found that after the top has been released from the accelerating torque, erection is not instantaneous but that erection over an arc of from 8' to 2', for example, takes place in approximately 50 seconds at 1100 R. P. M. and in 40 seconds at 900 R. P. M., indicating a very surprising and unexpected fact confirmed on all tops tested, namely, that the top erects faster to a stable position at lower speeds than it does at higher speeds.

It has been further found that the top is rotationally stable down to minimum speeds of from 700 to 800 R. P. M., so that when deviations from the vertical or horizontal of less than one minute of arc are to be sensed by the top, a cycle as follows has been found to be satisfactory for the particular top for which dimensions are given above:

Maximum speed=1700 R. P. M.
Minimum speed=800 R. P. M.
Acceleration time=20–30 seconds from 800 to 1700 R. P. M.
Erection period—30 seconds—with drive field removed.
Valid position sensing time—about 10 minutes.

As this cycle can be based on R. P. M., the cycle can be controlled by the use of the R. P. M. meter 45.

However, as it has been found the coasting time is exactly reproducible, control of the cycle by the timer 33 is entirely feasible. From an extreme safety point of view both devices can be used to supplement each other in maintaining a precise time-rotation cycle.

Aluminum tops are easily rotated by the rotating field of stator 5. Because of poor eddy current properties, tops made of metals such as stainless steel, for example, should be provided with concentric rings of aluminum and steel to reduce acceleration time. A stainless steel top usable in the assembly above described has been found to be satisfactory when weighing .35 lb. with a diameter of 3 5/16 inches. This top when provided with a 1/4 inch bearing ball as a peg, contacting a hard glass support surface of 3/4 inch radius was found to have erection times slightly shorter than the aluminum rotor first herein described, but otherwise found to be equal in accuracy. Stainless steel has one advantage in that it will take a high polish on its upper surface, so that the separate mirror 27 can be dispensed with.

In all of the precision tops observed, it was noted that as the top erected, the light spot on the reticle traced the conventional loxidromic trajectory, instead of the straight line set forth in the Bonneau patent cited above.

It was found however, that when the casing 1 is tilted (with attached lamp 50, mirror 52 and reticle 54), the axis of the top follows a straight line to the new indicated vertical, but precessions, in the system particularly described, about 30 sec. of arc are quickly damped out however. Sudden casing shocks also give rise to a small highly damped precession. Repeated displacements have proved that a gyroscopic top can consistently and continuously indicate the apparent vertical (or horizon) with an accuracy of from 10 to 20 seconds of arc for many hours, when built and operated in accordance with the teachings of the present invention as disclosed herein.

From the above description it will be apparent that there is thus provided a device of the character described possessing the particular features of advantage before enumerated as desirable, but which obviously is susceptible of modification in its form, proportions, detail construction and arrangement of parts without departing from the principle involved or sacrificing any of its advantages.

While in order to comply with the statute, the invention has been described in language more or less specific as to structural features, it is to be understood that the invention is not limited to the specific features shown, but that the means and construction herein disclosed comprise a preferred form of putting the invention into effect, and the invention is therefore claimed in any of its forms or modifications within the legitimate and valid scope of the appended claims.

What is claimed is:

1. A gyroscopic system comprising a top having as the sole support thereof a lower ball pivot held by a ball retainer in a position where the center of said ball coincides with the center of gravity of said top, a support for said ball having a supporting surface of greater radius than that of said ball, electrical torque producing means out of contact with said top for accelerating said top to a predetermined rotational speed, and means for removing all accelerating torques between said top and said torque producing means during a coasting period.

2. A gyroscopic system comprising a top having a ball pivot held by a ball retainer in a position where the center of said ball coincides with the center of gravity of said top, a support for said ball having a supporting surface of greater radius than that of said ball, means for accelerating said top to a predetermined rotational speed, means for removing all accelerating torques from said top during a coasting period and means for rotating said support.

3. A gyroscopic system comprising a top having a ball pivot held by a ball retainer in a position where the center of said ball coincides with the center of gravity of said top, a support for said ball having a supporting surface of greater radius than that of said ball, means for accelerating said top to a predetermined rotational speed, means for removing all accelerating torques from said top during a coasting period and means for rotating said support at a small angle to the axis of rotation of said top.

4. A gyroscopic system comprising a top having a ball pivot held by a ball retainer in a position where the center of said ball coincides with the center of gravity of said top, a support for said ball having a supporting surface of greater radius than that of said ball, means for accelerating said top to a predetermined rotational speed, means for removing all accelerating torques from said top during a coasting period, and means for rotating said support at a speed on the order of 10 R. P. M.

5. A gyroscopic system comprising a top having a ball pivot held by a ball retainer in a position where the center of said ball coincides with the center of gravity of said top, a support for said ball having a supporting surface of greater radius than that of said ball, accelerating torque producing means out of contact with said top for accelerating said top to a predetermined rotational speed, means for removing all accelerating torques from said top during a coasting period, and a crudely stabilized platform on which said support, top, and top accelerating means are mounted.

6. A gyroscopic system comprising a top having a ball pivot held by a ball retainer in a position where the center of said ball coincides with the center of gravity of said top, a support for said ball having a supporting surface of greater radius than that of said ball, accelerating torque producing means out of contact with said top for accelerating said top to a predetermined rotational speed, means for removing all accelerating torques from said top during a coasting period, and a crudely stabilized platform on which said support, top, and top accelerating means are mounted, the stabilization of said platform being on the order of about 1° to the horizontal.

7. Apparatus in accordance with claim 1 wherein said support is formed from a glass harder than said ball.

8. Apparatus in accordance with claim 1 wherein said ball is a steel bearing ball, and wherein said support is formed from a glass harder than said ball.

9. Apparatus in accordance with claim 1 wherein said top accelerating means is a motor stator surrounding said top together with means for producing a rotating field in said stator, said top containing a material acted on by said field to produce rotation of said top without contact between said top and said stator.

10. Apparatus in accordance with claim 1 wherein said top accelerating means is a motor stator surrounding said top together with means for producing a rotating field in said stator, said top containing a material acted on by said field to produce accelerated rotation of said top, and means for intermittently applying the field of said stator to said top to cause said top to coast freely between predetermined maximum and minimum speeds without contact between said top and said stator.

11. Apparatus in accordance with claim 1 wherein said top accelerating means is a motor stator surrounding said top together with means for producing a rotating field in said stator, said top containing a material acted on by said field to produce accelerated rotation of said top, means for intermittently applying the field of said stator to said top to cause said top to coast freely between predetermined maximum and minimum speeds wtihout contact with said stator, and means for sensing the position of said top while coasting.

12. Apparatus in accordance with claim 1 wherein said top accelerating means is a motor stator surrounding said top together with means for producing a rotating field in said stator, said top containing a material acted on by said field to produce accelerated rotation of said top, means for intermittently applying the field of said stator to said top to cause said top to coast freely between predetermined maximum and minimum speeds without contact with said stator, and means for optically sensing the position of said top while coasting.

13. Apparatus in accordance with claim 1 wherein optical means are provided to sense the position of said top during said coasting period.

14. Apparatus in accordance with claim 1 wherein means are provided to sense the position of said top while coasting, and only after a portion of said coasting period has expired.

References Cited in the file of this patent

UNITED STATES PATENTS

| | | |
|---|---|---|
| 705,702 | Ponthus et al. | July 29, 1902 |
| 791,983 | Leblanc | June 6, 1905 |
| 1,192,532 | Klahn | July 25, 1916 |
| 1,310,862 | Gray | July 22, 1919 |
| 1,435,580 | Bonneau | Nov. 14, 1922 |
| 1,666,721 | Sherrill | Apr. 17, 1928 |
| 1,857,736 | Morrison | May 10, 1932 |
| 1,984,859 | Bates | Dec. 18, 1934 |
| 1,989,826 | Schenk | Feb. 5, 1935 |
| 2,470,773 | Haskins | May 24, 1949 |

FOREIGN PATENTS

| | | |
|---|---|---|
| 140,142 | Great Britain | Mar. 17, 1920 |